(12) United States Patent
Uchiyama et al.

(10) Patent No.: US 8,230,273 B2
(45) Date of Patent: Jul. 24, 2012

(54) WIRELESS COMMUNICATION APPARATUS

(75) Inventors: Yoshifumi Uchiyama, Kawasaki (JP); Haruhiro Shino, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 358 days.

(21) Appl. No.: 12/718,318

(22) Filed: Mar. 5, 2010

(65) Prior Publication Data

US 2010/0229054 A1 Sep. 9, 2010

(30) Foreign Application Priority Data

Mar. 6, 2009 (JP) ................................. 2009-054040

(51) Int. Cl.
*G06F 11/00* (2006.01)
(52) U.S. Cl. .......................... 714/704; 714/820; 370/333
(58) Field of Classification Search .................. 455/522; 370/329, 318, 328, 333; 714/704, 820
See application file for complete search history.

(56) References Cited

U.S. PATENT DOCUMENTS

| | | | | |
|---|---|---|---|---|
| 7,016,699 | B2 * | 3/2006 | Koo et al. | 455/522 |
| 7,133,689 | B2 * | 11/2006 | Koo et al. | 455/522 |
| 7,492,735 | B2 * | 2/2009 | Zeira et al. | 370/329 |
| 7,801,548 | B2 * | 9/2010 | Koo et al. | 455/522 |
| 7,916,681 | B2 * | 3/2011 | Andersson et al. | 370/318 |
| 2010/0182951 | A1 * | 7/2010 | Park et al. | 370/328 |

FOREIGN PATENT DOCUMENTS

| | | |
|---|---|---|
| JP | 2006-80924 | 3/2006 |
| JP | 2007-500969 | 1/2007 |
| WO | 2005/013533 | 2/2005 |

\* cited by examiner

*Primary Examiner* — David Ton
(74) *Attorney, Agent, or Firm* — Katten Muchin Rosenman LLP (57) ABSTRACT

A wireless communication apparatus performs data communication with a base station using a plurality of transport channels (TRCHs) that share a frequency band, and selects a reference TRCH using coding schemes of data to be transmitted using the TRCHs. After that, the wireless communication apparatus performs outer loop control so that a block error rate (BLER) of the data to be transmitted using the reference TRCH is set to a target BLER.

5 Claims, 11 Drawing Sheets

CODING-SCHEME MANAGEMENT TABLE

| TRCH ID | CODING SCHEME |
|---------|---------------|
| T0001 | CONVOLUTIONAL CORDING 1/2 |
| T0002 | CONVOLUTIONAL CORDING 1/3 |
| T0003 | CONVOLUTIONAL CORDING 1/3 |
| T0004 | TURBO CORDING |
| ... | ... |

FIG.4

POINT MANAGEMENT TABLE

| CODING SCHEME | POINT |
|---------------|-------|
| CONVOLUTIONAL CORDING 1/2 | 20 |
| CONVOLUTIONAL CORDING 1/3 | 30 |
| TURBO CORDING | 50 |

POINT MANAGEMENT TABLE

| CONDITION | POINT |
|---|---|
| LOG10 (TARGET BLER) <-5 | 70 |
| -5≤LOG10 (TARGET BLER) <-4 | 60 |
| -4≤LOG10 (TARGET BLER) <-3 | 50 |
| -3≤LOG10 (TARGET BLER) <-2 | 40 |
| -2≤LOG10 (TARGET BLER) <-1 | 30 |
| -1≤LOG10 (TARGET BLER) <0 | 20 |
| LOG10 (TARGET BLER) =0 | 10 |

WIRELESS COMMUNICATION APPARATUS

CROSS-REFERENCE TO RELATED APPLICATION

This application is based upon and claims the benefit of priority of the prior Japanese Patent Application No. 2009-054040, filed on Mar. 6, 2009, the entire contents of which are incorporated herein by reference.

FIELD

The embodiments discussed herein are directed to a wireless communication apparatus that performs data communication with a base station using a plurality of transport channels.

BACKGROUND

A telecommunication scheme called "Wideband Code Division Multiple Access (W-CDMA)" is used to perform data communication between a wireless communication apparatus, such as a mobile phone, and a base station. In telecommunication using the W-CDMA, transport channels (TRCHs) are identified by spreading codes each allocated to a corresponding TRCH and data communication is performed using a plurality of TRCHs that share a single frequency band.

However, in an actual mobile communication environment where, for example, radio interference from another cell may occur, it is difficult to always maintain the quality of signals that the wireless communication apparatus receives from the base station at a desired level. To solve the problem, the wireless communication apparatus measures a signal-to-interference ratio (SIR) and performs inner loop control to set the SIR closer to a target SIR.

Because the moving speed and the communication environments are subjected to change, the SIR to produce the desired quality (block error rate: BLER) is not fixed. To cope with these changes, the wireless communication apparatus measures the BLER and performs outer loop control in which, if the measured BLER is worse than a target BLER, the wireless communication apparatus increases the target SIR and, if the measured BLER is better than the target BLER, the wireless communication apparatus decreases the target SIR (see, for example, Japanese Laid-open Patent Publication No. 2006-80924).

In the existing wireless communication apparatus, the criterion for the outer loop control differs among TRCHs; therefore, if a plurality of TRCHs are present, the wireless communication apparatus selects a reference TRCH from the plurality of TRCHs and performs the outer loop control in accordance with the criterion of the selected TRCH.

If a wireless communication apparatus is designed to select a specified TRCH from a plurality of TRCHs, the wireless communication apparatus selects the specified TRCH using, for example, a type of data (e.g., audio data and image data) to be transmitted using the TRCHs or a combination of the types. If, for example, a TRCH that transmits audio data and a TRCH that transmits image data are present, the wireless communication apparatus selects the TRCH that transmits image data.

A technology is currently used that measures BLERs of individual TRCHs, selects a TRCH having the worst BLER, and performs the outer loop control so that no TRCH has a BLER lower than the target BLER (see, for example, Japanese National Publication of International Patent Application No. 2007-500969).

However, because, in the above-described conventional technologies, the reference TRCH is selected in accordance with expected conditions, it is impossible to cope with an unexpected condition (e.g., an unexpected combination of types of data included in a packet). This may prevent implementation of the most-suitable outer loop control.

Moreover, although the method of measuring the BLERs of the individual TRCHs and selecting the most-suitable TRCH using the measured result as described above is effective, because a long time is needed to measure the BLERs, there is possibility that there is an increase in the time necessary to obtain a stable BLER from the start of communication.

There is an obvious need for a technology that selects the most-suitable TRCH for the outer loop control in accordance with a variety of conditions that are set related to the TRCHs.

SUMMARY

According to an aspect of an embodiment of the invention, a wireless communication apparatus that performs data communication with a base station using a plurality of channels that share a frequency band, includes a storage unit that stores therein information to identify the channels and coding schemes or target error rates of data to be transmitted using the channels in an associated manner; a selecting unit that selects a reference channel according to the coding schemes or target error rates of the data to be transmitted using the channels; and an outer-loop control unit that performs outer loop control so that an error rate of the data to be transmitted using the reference channel selected by the selecting unit is set to a target error rate.

According to another aspect of an embodiment of the invention, a wireless communication apparatus that performs data communication with a base station using a plurality of channels that share a frequency band, includes a calculating unit that calculates rate matching ratios of data to be transmitted using the channels; a selecting unit that selects a reference channel according to the calculated result obtained by the calculating unit; and an outer-loop control unit that performs outer loop control so that an error rate of the data to be transmitted using the reference channel selected by the selecting unit is set to a target error rate.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings.

[a] First Embodiment

An outline and features of a wireless communication apparatus according to a first embodiment of the present invention is described below. When the wireless communication apparatus according to the first embodiment performs data communication with a base station using a plurality of TRCHs (transport channels) that share a frequency band, the wireless communication apparatus selects a reference TRCH using coding schemes of data to be transmitted using the TRCHs. After that, the wireless communication apparatus performs outer loop control so that a BLER (block error rate) of data to be transmitted using the reference TRCH is set to a target BLER.

In this manner, the wireless communication apparatus according to the first embodiment selects the reference TRCH from the plurality of TRCHs using the data coding scheme; therefore, the wireless communication apparatus may select the most-suitable TRCH and perform outer loop control in an appropriate manner (which results in stability of line quality being maintained).

The outer loop control and the inner loop control used in the first embodiment are described below. In the outer loop control, the wireless communication apparatus compares the current BLER with the target BLER and increases/decreases the target SIR so that the current BLER converges to the target BLER.

The wireless communication apparatus performs the inner loop control to receive signals at a desired SIR (signal-to-interference ratio). The wireless communication apparatus compares the current SIR with the target SIR and requests the base station to increase/decrease the downlink power so that the current SIR is set within the target SIR.

Figure 1:
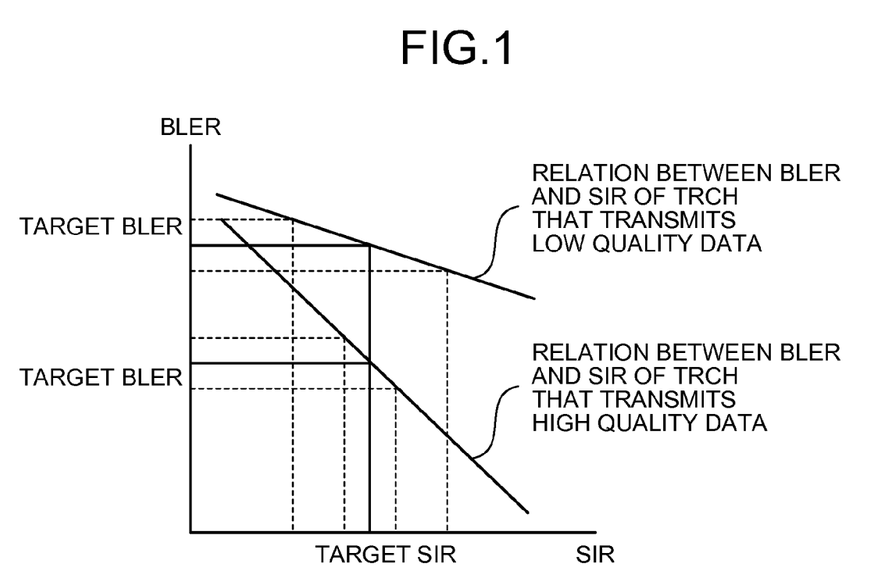
FIG. 1 is a graph of the relation between BLER and SIR.

The relation between BLER and SIR is described below. FIG. 1 is a graph of the relation between BLER and SIR. As illustrated in FIG. 1, a rate of change of the BLER with the SIR differs depending on whether the quality of data to be transmitted is low. More particularly, the rate of change of the BLER with the SIR in a TRCH that transmits low quality data (bearer with a small coding gain) is larger than the rate of change in a TRCH that transmits high quality data (bearer with a large coding gain).

If the target BLER having the same variation width is set, as illustrated in FIG. 1, the variation width of the target SIR of the TRCH that transmits the high quality data is narrower than the variation width of the target SIR of the TRCH that transmits the low quality data. Therefore, the TRCH that transmits the high quality data is more effective than the TRCH that transmits the low quality data as the reference TRCH to suppress the variation among the target SIRs and the variation among the BLERs. With a decrease in the variation among the BLERs, the risk caused by degraded BLER, such as discontinuous sound and cutting-off of communication, is reduced and the shortage of the line capacity caused by the BLER having an excessively high quality is reduced.

Figure 2:
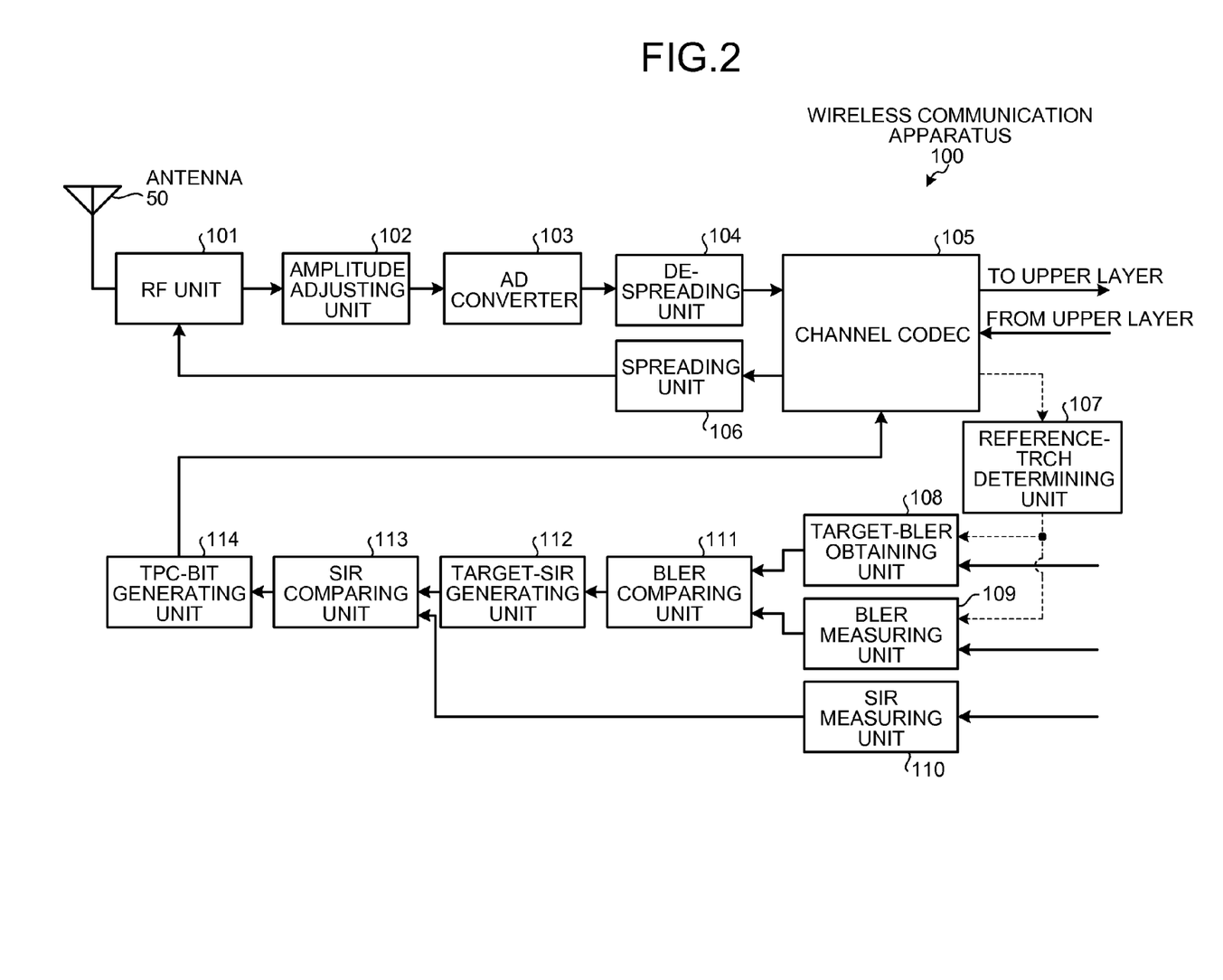
FIG. 2 is a block diagram of the functional configuration of a wireless communication apparatus according to a first embodiment.

The configuration of the wireless communication apparatus according to the first embodiment is described below. FIG. 2 is a block diagram of the functional configuration of a wireless communication apparatus 100 according to the first embodiment. As illustrated in FIG. 1, the wireless communication apparatus 100 includes an antenna 50, an RF (radio frequency) unit 101, an amplitude adjusting unit 102, an AD (analog/digital) converter 103, a de-spreading unit 104, a channel CODEC 105, a spreading unit 106, a reference-TRCH determining unit 107, a target-BLER obtaining unit 108, a BLER measuring unit 109, an SIR measuring unit 110, a BLER comparing unit 111, a target-SIR generating unit 112, an SIR comparing unit 113, and a TPC (transmission power control)-bit generating unit 114.

The RF unit 101 transmits/receives data to/from the base station (not depicted) using the antenna 50. Upon receiving data from the base station, the RF unit 101 outputs the data to the amplitude adjusting unit 102. Upon receiving data from the spreading unit 106, the RF unit 101 transmits the data to the base station.

The amplitude adjusting unit 102 adjusts the amplitude of the data received from the RF unit 101. The amplitude adjusting unit 102 outputs the amplitude-adjusted data to the AD converter 103.

The AD converter 103 converts the data received from the amplitude adjusting unit 102 (analog signal) into a digital signal. The AD converter 103 outputs the converted data, i.e., the digital signal to the de-spreading unit 104.

The de-spreading unit 104 de-spreads data that has been spreadingly modulated using a spreading code (e.g., a pseudo random number) and extracts data about individual TRCHs from the demodulated data. The de-spreading unit 104 outputs the extracted data to the channel CODEC 105 in associated with identification information of the TRCHs (hereinafter, "TRCH IDs").

Figure 3:
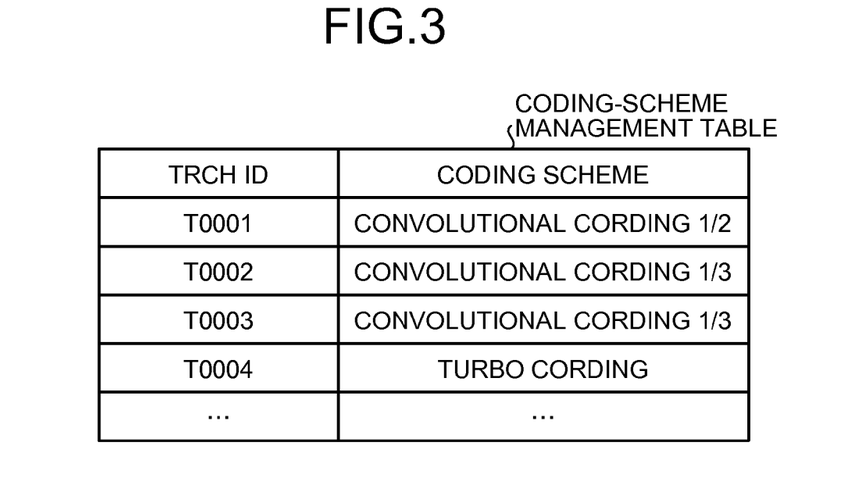
FIG. 3 is a table that explains the data structure of a coding-scheme management table according to the first embodiment.

The channel CODEC 105 encodes/decodes data. The channel CODEC 105 stores therein a coding-scheme management table and performs data encoding/decoding using the coding-scheme management table. FIG. 3 is a table that explains the data structure of the coding-scheme management table.

As illustrated in FIG. 3, the coding-scheme management table stores therein TRCH IDs to identify the TRCHs and coding schemes in an associated manner. As illustrated in FIG. 3, for example, the coding scheme of the TRCH having the TRCH ID number "T0001" is "convolutional cording ½". Information registered to the coding-scheme management table is notification information from the base station.

Upon receiving the TRCH ID and data to be decoded from the de-spreading unit 104, the channel CODEC 105 determines the coding scheme by comparing the received TRCH ID with the coding-scheme management table and decodes the data using the determined coding scheme. The channel CODEC 105 outputs the decoded data to an upper layer.

Upon receiving the TRCH ID and data to be decoded from an upper layer, the channel CODEC 105 determines the coding scheme by comparing the received TRCH ID with the coding-scheme management table and encodes the data using the determined coding scheme. The channel CODEC 105 outputs the encoded data to the spreading unit 106.

The channel CODEC 105 outputs information about the coding-scheme management table to the reference-TRCH determining unit 107.

Upon receiving the data from the channel CODEC 105, the spreading unit 106 spreadingly modulates the data using the spreading code. The spreading unit 106 outputs the spreadingly-modulated data to the RF unit 101.

The reference-TRCH determining unit 107 selects the reference TRCH from the plurality of TRCHs using the coding scheme. More particularly, the reference-TRCH determining unit 107 stores therein a point management table and identifies, upon receiving the information about the coding-scheme management table from the channel CODEC 105, points that are corresponding to the individual TRCHs by comparing the coding-scheme management table with the point management table.

Figure 4:
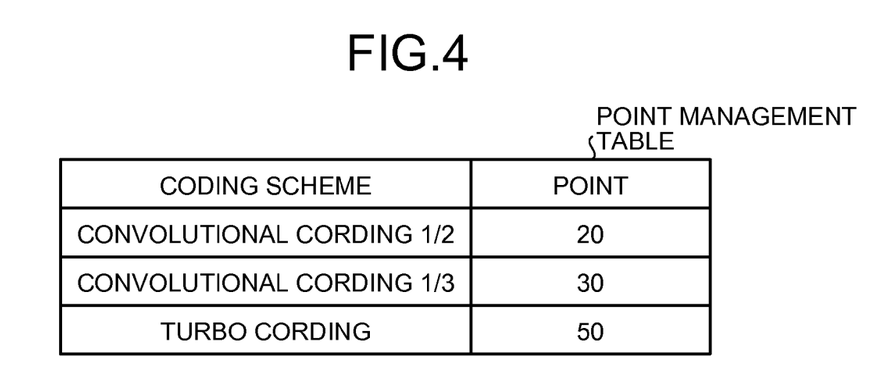
FIG. 4 is a table that explains the data structure of a point management table according to the first embodiment.

FIG. 4 is a table that explains the data structure of the point management table according to the first embodiment. As illustrated in FIG. 4, the point management table stores therein points and coding schemes in an associated manner. As illustrated in FIG. 4, for example, the point of the TRCH having the coding scheme "convolutional cording ½" is "20".

The reference-TRCH determining unit 107 identifies the points of the individual TRCHs and determines a TRCH having the largest point as the reference TRCH. The reference-TRCH determining unit 107 outputs the ID (identification information) of the reference TRCH to both the target-BLER obtaining unit 108 and the BLER measuring unit 109.

The target-BLER obtaining unit 108 selects the target BLER corresponding to the reference TRCH from the predetermined target BLERs of the individual TRCHs and outputs information about the selected target BLER to the BLER comparing unit 111.

The target-BLER obtaining unit 108 stores therein a target-BLER table that includes the individual TRCH IDs and the target BLERs in an associated manner and determines the target BLER corresponding to the reference TRCH by comparing the TRCH ID received from the reference-TRCH determining unit 107 with the target-BLER table. The target-BLER obtaining unit 108 outputs information about the target BLER corresponding to the TRCH ID as a determined result to the BLER comparing unit 111.

The BLER measuring unit 109 measures BLERs. The BLER measuring unit 109 measures BLERs of the individual TRCH by checking CRC bits included in data for the individual TRCHs that has been decoded by the channel CODEC 105. Upon receiving the TRCH ID number from the reference-TRCH determining unit 107, the BLER measuring unit 109 outputs information about a BLER corresponding to the TRCH ID number to the BLER comparing unit 111.

The SIR measuring unit 110 measures SIRs. The SIR measuring unit 110 outputs information about the measured SIRs to the SIR comparing unit 113.

The BLER comparing unit 111 compares information about the target BLER with information about the BLER and outputs the compared result to the target-SIR generating unit 112.

Upon receiving the compared result from the BLER comparing unit 111, the target-SIR generating unit 112 generates a target SIR so that the BLER is set within the target BLER. The target-SIR generating unit 112 outputs information about the generated target SIR to the SIR comparing unit 113.

The SIR comparing unit 113 compares information about the target SIR with information about the SIR and outputs the compared result to the TPC-bit generating unit 114.

Upon receiving the compared result from the SIR comparing unit 113, the TPC-bit generating unit 114 requests the base station to increase/decrease the downlink power so that the SIR is set within the target SIR.

Figure 5:
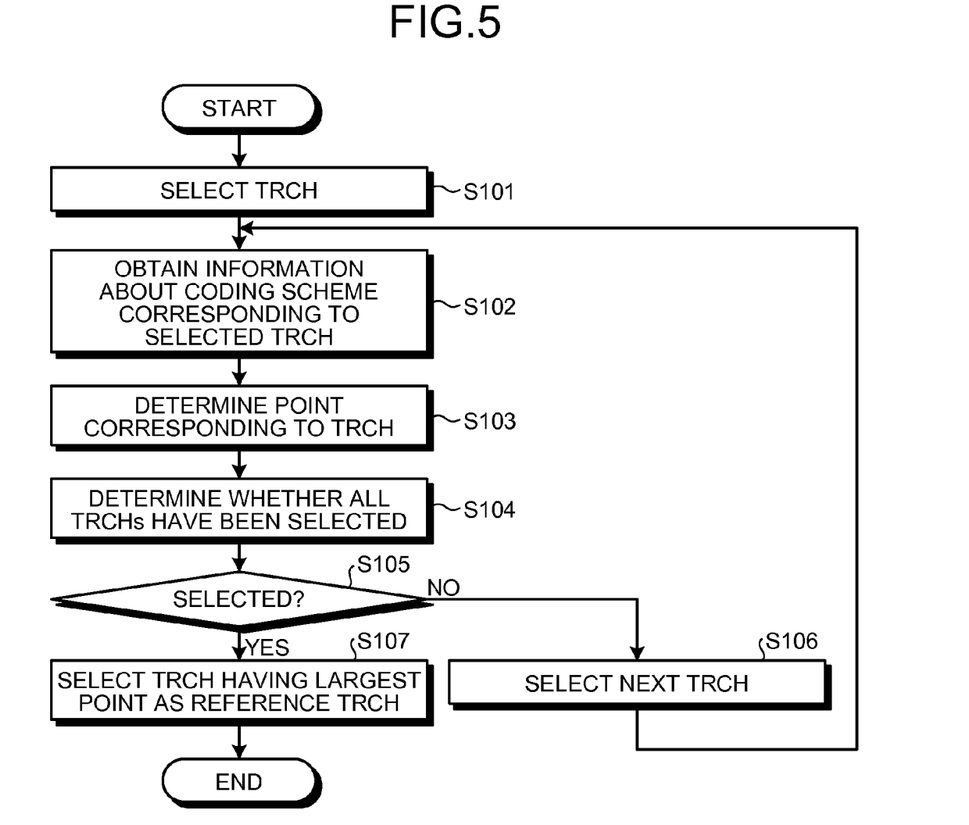
FIG. 5 is a flowchart of a process of selecting a TRCH performed by the wireless communication apparatus according to the first embodiment.

A process of selecting a TRCH performed by the wireless communication apparatus 100 according to the first embodiment is described below. FIG. 5 is a flowchart of the process of selecting a TRCH performed by the wireless communication apparatus 100 according to the first embodiment.

As illustrated in FIG. 5, in the wireless communication apparatus 100, the reference-TRCH determining unit 107 selects a TRCH (Step S101) and obtains information about the coding scheme corresponding to the selected TRCH (Step S102).

The reference-TRCH determining unit 107 determines a point corresponding to the TRCH (Step S103) and determines whether all the TRCHs have been selected (Step S104). If one or more TRCHs have not been selected (No at Step S104), the next TRCH is selected (Step S106) and the process control goes to Step S102.

If all the TRCHs have been selected (Yes at Step S104), the reference-TRCH determining unit 107 selects a TRCH having the largest point as the reference TRCH (Step S107).

As described above, when the wireless communication apparatus 100 according to the first embodiment performs data communication with the base station using a plurality of TRCHs that share a frequency band, the wireless communication apparatus 100 selects the reference TRCH using the coding schemes of data to be transmitted using the TRCHs. After that, the wireless communication apparatus 100 performs outer loop control so that the BLER of data to be transmitted using the reference TRCH is set to the target BLER; therefore, the wireless communication apparatus 100 may select the most-suitable TRCH and perform the outer loop control in an appropriate manner.

The wireless communication apparatus 100 according to the first embodiment sets a point of a coding scheme for low quality data smaller than a point of a coding scheme for high quality data (see the point management table of FIG. 4); accordingly, a TRCH that transmits high quality data is selected, which leads to suppression in the variation among the target SIRs and the variation among the BLERs (see FIG. 1).

[b] Second Embodiment

An outline and features of a wireless communication apparatus according to a second embodiment of the present invention is described below. When the wireless communication apparatus according to the second embodiment performs data communication with a base station using a plurality of TRCHs that share a frequency band, the wireless communication apparatus selects the reference TRCH using a rate matching ratio of data to be transmitted using the TRCHs. After that, the wireless communication apparatus performs outer loop control so that the BLER of data to be transmitted using the reference TRCH is set to the target BLER.

In this manner, the wireless communication apparatus according to the second embodiment selects the reference TRCH from the plurality of TRCHs using the rate matching ratio; therefore, the wireless communication apparatus may select the most-suitable TRCH and perform outer loop control in an appropriate manner.

Figure 6:
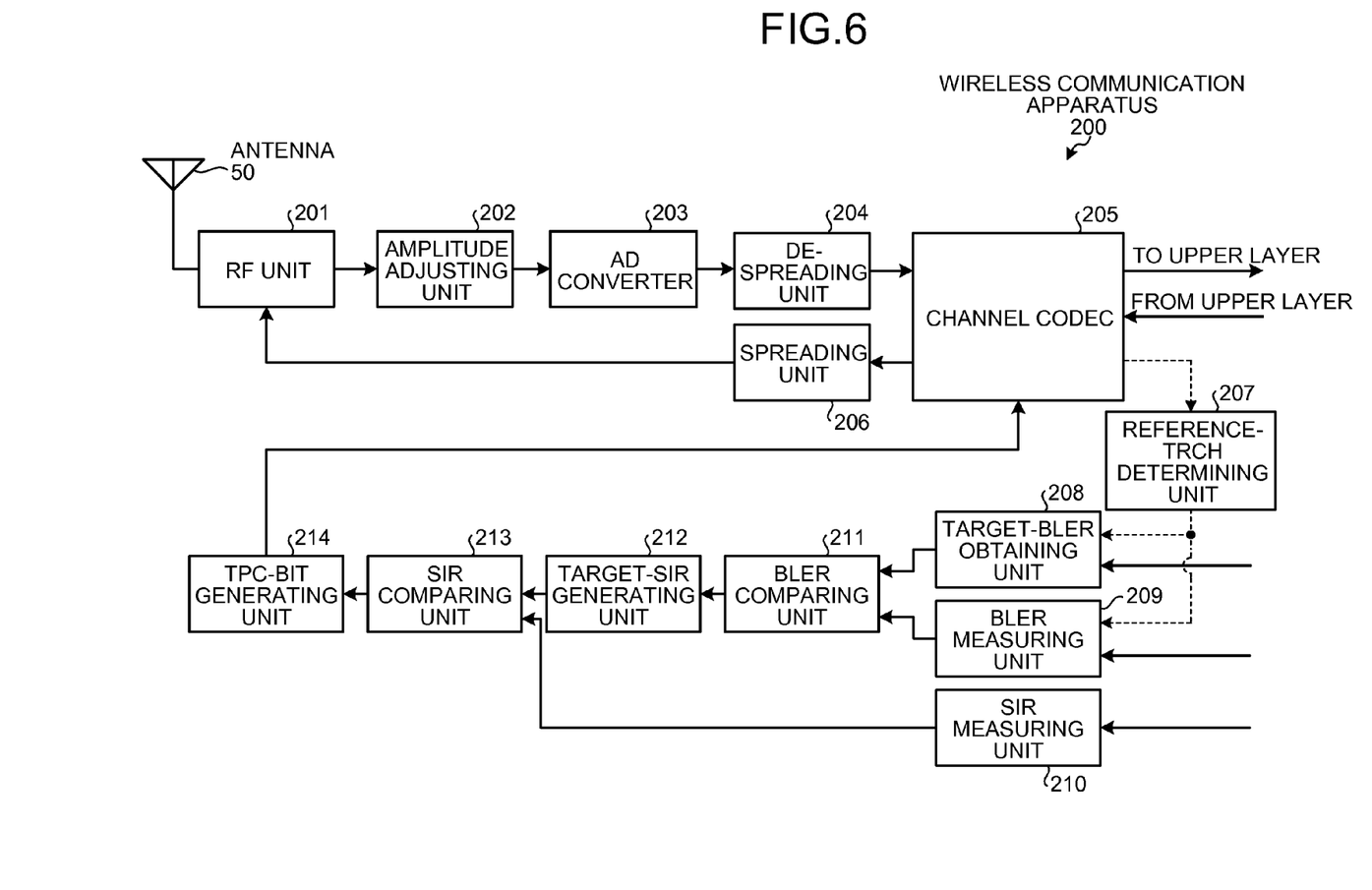
FIG. 6 is a block diagram of the functional configuration of a wireless communication apparatus according to a second embodiment.

The configuration of a wireless communication apparatus 200 according to the second embodiment is described below. FIG. 6 is a block diagram of the functional configuration of the wireless communication apparatus 200 according to the second embodiment. As illustrated in FIG. 6, the wireless communication apparatus 200 includes the antenna 50, an RF (radio frequency) unit 201, an amplitude adjusting unit 202, an AD (analog/digital) converter 203, a de-spreading unit 204, a channel CODEC 205, a spreading unit 206, a reference-TRCH determining unit 207, a target-BLER obtaining unit 208, a BLER measuring unit 209, an SIR measuring unit 210, a BLER comparing unit 211, a target-SIR generating unit 212, an SIR comparing unit 213, and a TPC (transmission power control)-bit generating unit 214.

Among those units, the antenna 50, the RF unit 201, the amplitude adjusting unit 202, the AD converter 203, the de-spreading unit 204, the spreading unit 206, the target-BLER obtaining unit 208, the BLER measuring unit 209, the SIR measuring unit 210, the BLER comparing unit 211, the target-SIR generating unit 212, the SIR comparing unit 213, and the TPC-bit generating unit 214 are the same as the antenna 50, the RF unit 101, the amplitude adjusting unit 102, the AD converter 103, the de-spreading unit 104, the spreading unit 106, the target-BLER obtaining unit 108, the BLER measuring unit 109, the SIR measuring unit 110, the BLER comparing unit 111, the target-SIR generating unit 112, the SIR comparing unit 113, and the TPC-bit generating unit 114, illustrated in FIG. 2, respectively.

The channel CODEC 205 encodes/decodes data. The manner how the channel CODEC 205 encodes/decodes data is the same as the manner how the channel CODEC 105 illustrated in FIG. 2 encodes/decodes data.

The channel CODEC 205 according to the second embodiment, in particular, outputs the TRCH ID and data to be transmitted on the TRCH (decoded data) to the reference-TRCH determining unit 207 in an associated manner.

The reference-TRCH determining unit 207 selects the reference TRCH from the plurality of TRCHs using the rate matching ratios of data to be transmitted on the individual TRCHs. More particularly, the reference-TRCH determining unit 207 calculates points of the individual TRCHs using the rate matching ratios and selects a TRCH having the largest point as the reference TRCH.

The reference-TRCH determining unit 207 calculates the point of the TRCH using the rate matching ratio by the following Equation:

$$\text{point of } TRCH = 100 \times (N + \Delta N)/N - 100$$

where N is a sum of the rate matching ratios of all the TRCHs and $\Delta N$ is the rate matching ratio of the TRCH that is subjected to the point calculation. The rate matching ratio is calculated using a well-known technology.

After the reference-TRCH determining unit 207 calculates the points of the individual TRCHs and selects the reference TRCH, the reference-TRCH determining unit 207 outputs the ID of the reference TRCH to both the target-BLER obtaining unit 208 and the BLER measuring unit 209.

Figure 7:
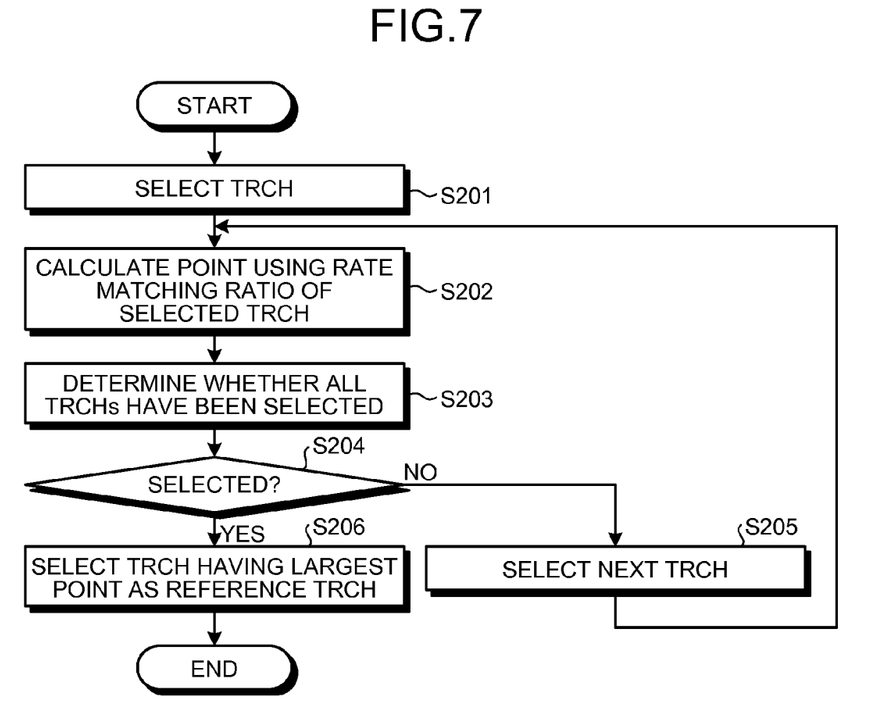
FIG. 7 is a flowchart of a process of selecting a TRCH performed by the wireless communication apparatus according to the second embodiment.

A process of selecting a TRCH performed by the wireless communication apparatus 200 according to the second embodiment is described below. FIG. 7 is a flowchart of the process of selecting a TRCH performed by the wireless communication apparatus 200 according to the second embodiment.

As illustrated in FIG. 7, in the wireless communication apparatus 200, the reference-TRCH determining unit 207 selects a TRCH (Step S201) and calculates a point using the rate matching ratio of the selected TRCH (Step S202).

After that, the reference-TRCH determining unit 207 determines whether all the TRCHs have been selected (Step S203). If one or more TRCHs have not been selected (No at Step S204), the next TRCH is selected (Step S205) and the process control goes to Step S202.

If all the TRCHs have been selected (Yes at Step S204), the reference-TRCH determining unit 207 selects a TRCH having the largest point as the reference TRCH (Step S206).

In this manner, the reference-TRCH determining unit 207 calculates the point using the rate matching ratios of the individual TRCHs that are subjected to change with the elapse of time; therefore, the reference-TRCH determining unit 207 may select the most-suitable TRCH.

As described above, when the wireless communication apparatus 200 according to the second embodiment performs data communication with the base station using a plurality of TRCHs that share a frequency band, the wireless communication apparatus 200 selects the reference TRCH using the rate matching ratios of data to be transmitted using the TRCHs. After that, the wireless communication apparatus 200 performs outer loop control so that the BLER of data to be transmitted using the reference TRCH is set to the target BLER; therefore, the wireless communication apparatus 200 may select the most-suitable TRCH and perform the outer loop control in an appropriate manner.

[c] Third Embodiment

An outline and features of a wireless communication apparatus according to a third embodiment of the present invention is described below. When the wireless communication apparatus according to the third embodiment performs data communication with a base station using a plurality of TRCHs that share a frequency band, the wireless communication apparatus selects the reference TRCH using the predetermined target BLERs of the individual TRCHs. After that, the wireless communication apparatus performs outer loop control so that the BLER of data to be transmitted using the reference TRCH is set to the target BLER.

In this manner, the wireless communication apparatus according to the third embodiment selects the reference TRCH from the plurality of TRCHs using the predetermined target BLERs of the individual TRCHs; therefore, a step of measuring BLERs for selecting the reference TRCH is not needed, which allows the wireless communication apparatus to select the most-suitable TRCH as the reference TRCH in a prompt manner.

Figure 8:
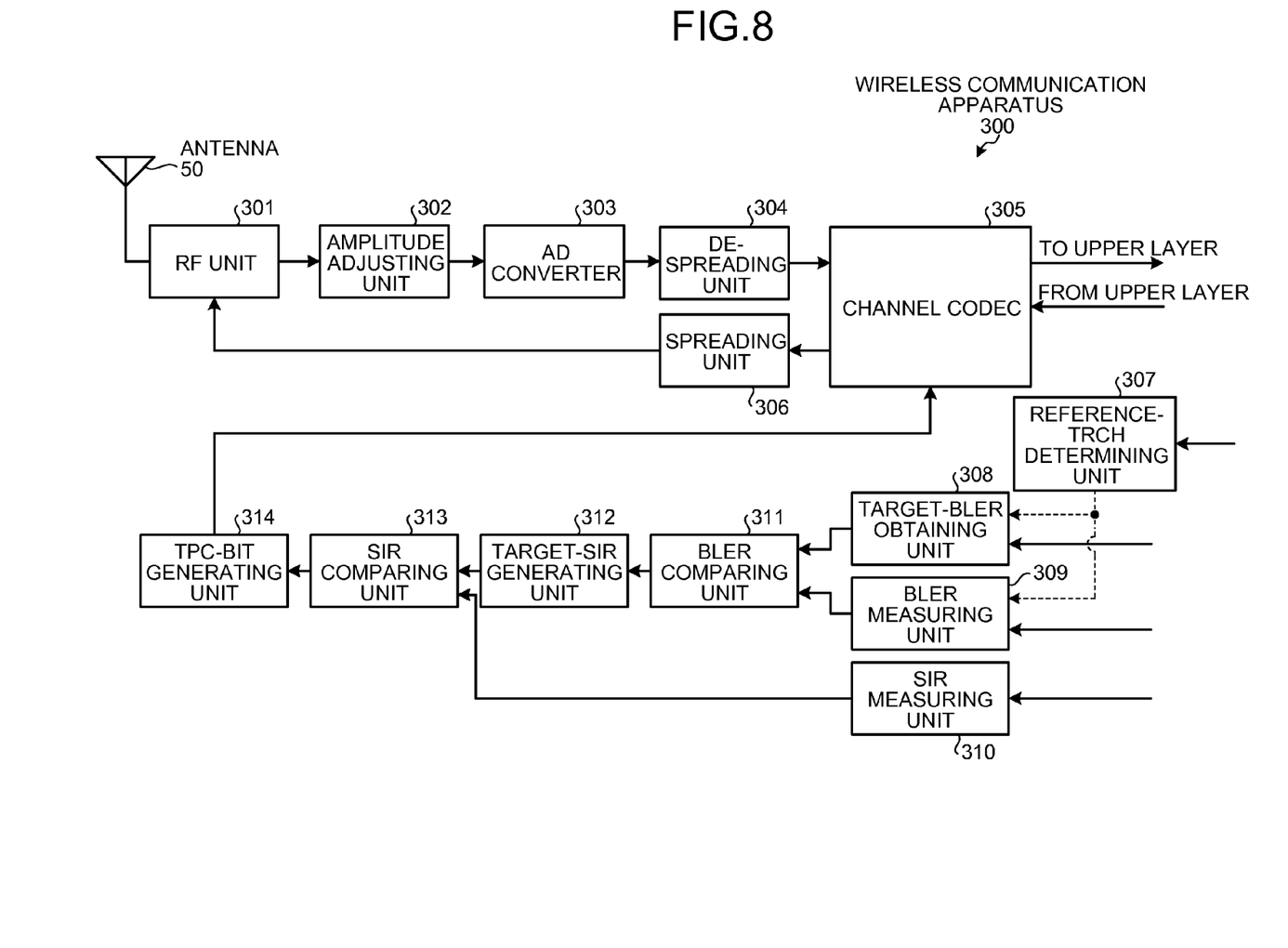
FIG. 8 is a block diagram of the functional configuration of a wireless communication apparatus according to a third embodiment.

The configuration of a wireless communication apparatus 300 according to the third embodiment is described below. FIG. 8 is a block diagram of the functional configuration of the wireless communication apparatus 300 according to the third embodiment. As illustrated in FIG. 8, the wireless communication apparatus 300 includes the antenna 50, an RF (radio frequency) unit 301, an amplitude adjusting unit 302, an AD (analog/digital) converter 303, a de-spreading unit 304, a channel CODEC 305, a spreading unit 306, a reference-TRCH determining unit 307, a target-BLER obtaining unit 308, a BLER measuring unit 309, an SIR measuring unit 310, a BLER comparing unit 311, a target-SIR generating unit 312, an SIR comparing unit 313, and a TPC (transmission power control)-bit generating unit 314.

Among those units, the antenna 50, the RF unit 301, the amplitude adjusting unit 302, the AD converter 303, the de-spreading unit 304, the spreading unit 306, the target-BLER obtaining unit 308, the BLER measuring unit 309, the SIR measuring unit 310, the BLER comparing unit 311, the target-SIR generating unit 312, the SIR comparing unit 313, and the TPC-bit generating unit 314 are the same as the antenna 50, the RF unit 101, the amplitude adjusting unit 102, the AD converter 103, the de-spreading unit 104, the spreading unit 106, the target-BLER obtaining unit 108, the BLER measuring unit 109, the SIR measuring unit 110, the BLER comparing unit 111, the target-SIR generating unit 112, the SIR comparing unit 113, and the TPC-bit generating unit 114, illustrated in FIG. 2, respectively.

The channel CODEC 305 encodes/decodes data. The manner how the channel CODEC 305 encodes/decodes data is the same as the manner how the channel CODEC 105 illustrated in FIG. 2 encodes/decodes data.

The reference-TRCH determining unit 307 selects the reference TRCH from the plurality of TRCHs using the predetermined target BLERs of the individual TRCHs. The reference-TRCH determining unit 307 stores therein a point management table and identifies, upon receiving information about the predetermined target BLERs of the individual TRCHs, points that are corresponding to the individual TRCHs by comparing the received information with the point management table.

Figure 9:
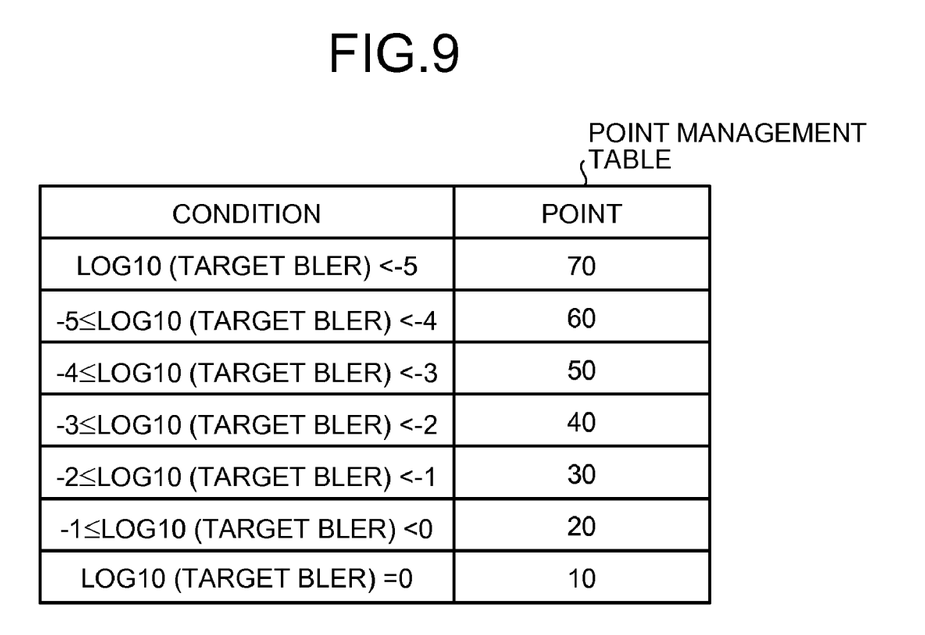
FIG. 9 is a table that explains the data structure of a point management table according to the third embodiment.

FIG. 9 is a table that explains the data structure of the point management table according to the third embodiment. As illustrated in FIG. 9, the point management table stores therein conditions and points in an associated manner. As illustrated in FIG. 9, for example, if the value of LOG 10 (target BLER) is smaller than −5, the point of the TRCH corresponding to the target BLER is "70".

The reference-TRCH determining unit 307 identifies the points of the individual TRCHs and determines a TRCH having the largest point as the reference TRCH. The reference-TRCH determining unit 307 outputs the ID (identification information) of the reference TRCH to both the target-BLER obtaining unit 308 and the BLER measuring unit 309.

Figure 10:
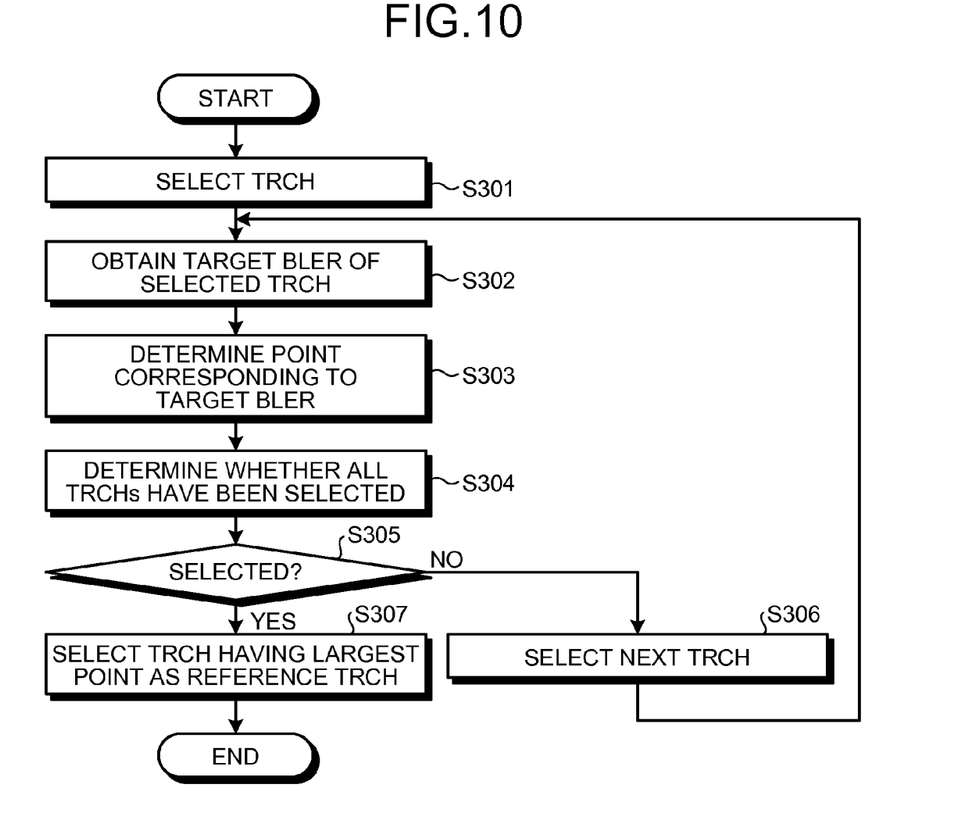
FIG. 10 is a flowchart of a process of selecting a TRCH performed by the wireless communication apparatus according to the third embodiment.

A process of selecting a TRCH performed by the wireless communication apparatus 300 according to the third embodiment is described below. FIG. 10 is a flowchart of the process of selecting a TRCH performed by the wireless communication apparatus 300 according to the third embodiment.

As illustrated in FIG. 10, in the wireless communication apparatus 300, the reference-TRCH determining unit 307 selects a TRCH (Step S301) and obtains the target BLER of the selected TRCH (Step S302).

After that, the reference-TRCH determining unit 307 determines a point corresponding to the target BLER (Step S303) and determines whether all the TRCHs have been selected (Step S304). If one or more TRCHs have not been selected (No at Step S305), the next TRCH is selected (Step S306) and the process control goes to Step S302.

If all the TRCHs have been selected (Yes at Step S305), the reference-TRCH determining unit 307 selects a TRCH having the largest point as the reference TRCH (Step S307).

As described above, when the wireless communication apparatus 300 according to the third embodiment performs data communication with the base station using a plurality of TRCHs that share a frequency band, the wireless communication apparatus 300 selects the reference TRCH using the predetermined target BLERs of the individual TRCHs. After that, the wireless communication apparatus 300 performs outer loop control so that the BLER of data to be transmitted using the reference TRCH is set to the target BLER; therefore, a step of measuring BLERs for selecting the reference TRCH is not needed, which allows the wireless communication apparatus 300 to select the most-suitable TRCH as the reference TRCH in a prompt manner.

[d] Fourth Embodiment

An outline and features of a wireless communication apparatus according to a fourth embodiment of the present invention is described below. When the wireless communication apparatus according to the fourth embodiment performs data communication with the base station using a plurality of TRCHs that share a frequency band, the wireless communication apparatus selects the reference TRCH using the coding schemes of data to be transmitted using the TRCHs, the rate matching ratios, and the target BLERs. After that, the wireless communication apparatus performs outer loop control so that the BLER of data to be transmitted using the reference TRCH is set to the target BLER.

In this manner, the wireless communication apparatus according to the fourth embodiment selects the reference TRCH from the plurality of TRCHs using the data coding schemes, the rate matching ratios, and the target BLERs; therefore, the wireless communication apparatus may select the most-suitable TRCH from the perspective of a variety of conditions and perform outer loop control in an appropriate manner.

Figure 11:
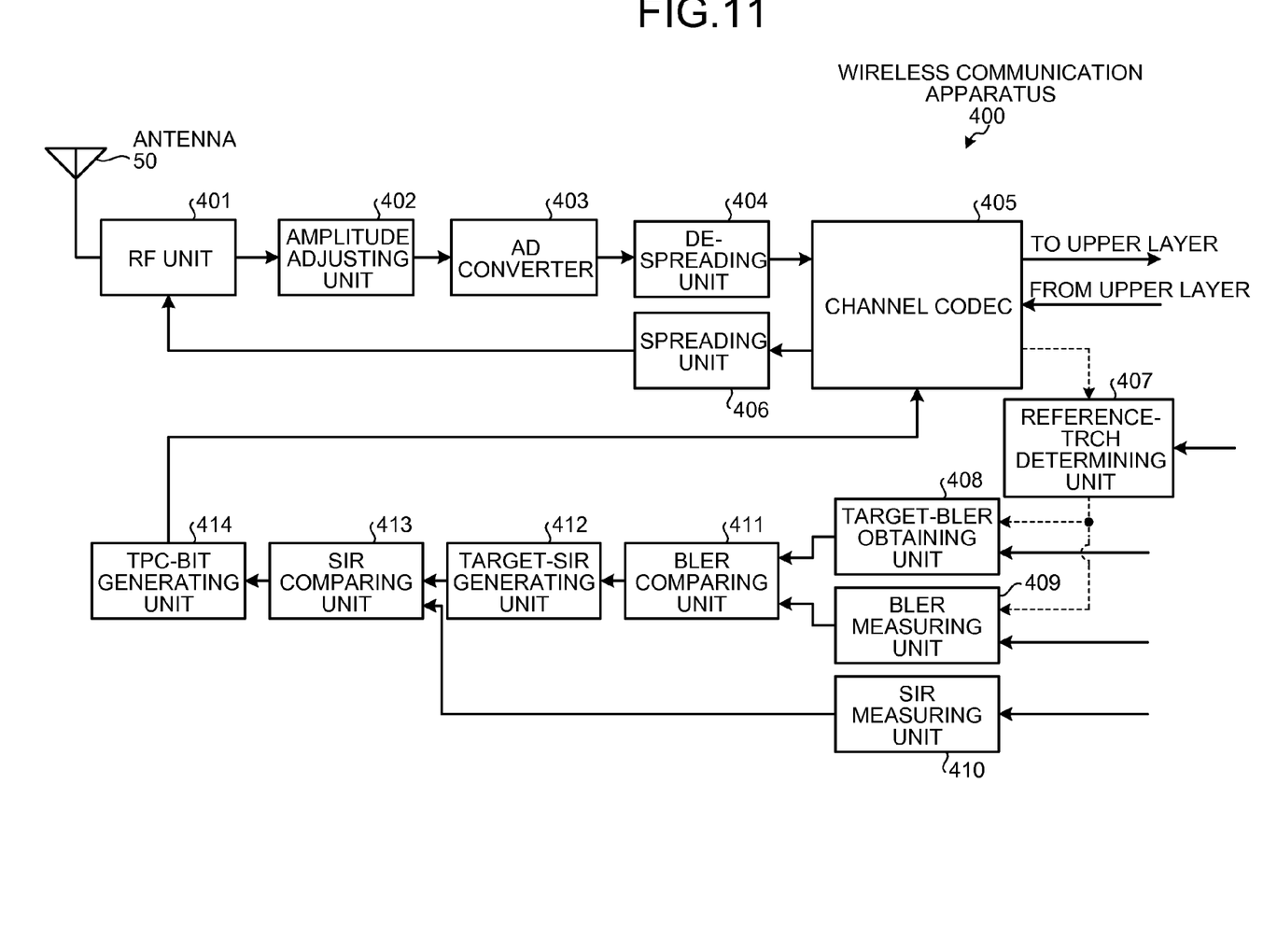
FIG. 11 is a block diagram of the functional configuration of a wireless communication apparatus according to a fourth embodiment.

The configuration of a wireless communication apparatus 400 according to the fourth embodiment is described below. FIG. 11 is a block diagram of the functional configuration of the wireless communication apparatus 400 according to the fourth embodiment. As illustrated in FIG. 11, the wireless communication apparatus 400 includes the antenna 50, an RF (radio frequency) unit 401, an amplitude adjusting unit 402, an AD (analog/digital) converter 403, a de-spreading unit 404, a channel CODEC 405, a spreading unit 406, a reference-TRCH determining unit 407, a target-BLER obtaining unit 408, a BLER measuring unit 409, an SIR measuring unit 410, a BLER comparing unit 411, a target-SIR generating unit 412, an SIR comparing unit 413, and a TPC (transmission power control)-bit generating unit 414.

Among those units, the antenna 50, the RF unit 401, the amplitude adjusting unit 402, the AD converter 403, the de-spreading unit 404, the spreading unit 406, the target-BLER obtaining unit 408, the BLER measuring unit 409, the SIR measuring unit 410, the BLER comparing unit 411, the target-SIR generating unit 412, the SIR comparing unit 413, and the TPC-bit generating unit 414 are the same as the antenna 50, the RF unit 101, the amplitude adjusting unit 102, the AD converter 103, the de-spreading unit 104, the spreading unit 106, the target-BLER obtaining unit 108, the BLER measuring unit 109, the SIR measuring unit 110, the BLER comparing unit 111, the target-SIR generating unit 112, the SIR comparing unit 113, and the TPC-bit generating unit 114, illustrated in FIG. 2, respectively.

The channel CODEC 405 encodes/decodes data. The manner how the channel CODEC 405 encodes/decodes data is the same as the manner how the channel CODEC 105 illustrated in FIG. 2 encodes/decodes data.

The channel CODEC 405 according to the fourth embodiment, in particular, outputs information about the coding-scheme management table (see FIG. 3), the individual TRCH IDs, and the data to be transmitted on the TRCHs in an associated manner to the reference-TRCH determining unit 407.

The reference-TRCH determining unit 407 selects the reference TRCH from the plurality of TRCHs using the data coding schemes, the rate matching ratios, and the target BLERs. More particularly, the reference-TRCH determining unit 407 obtains a point using the coding scheme (hereinafter, "FECp"), a point using the rate matching ratio (hereinafter, "RMp"), and a point using the target BLER (hereinafter, "TBLERp") of each TRCH and calculates a sum of FECp, RMp, and TBLERp as a total point of the TRCH (point of TRCH=FECp+RMp+TBLERp).

The reference-TRCH determining unit 407 calculates the points of the individual TRCHs and selects a TRCH having the largest point as the reference TRCH. After calculating the points of the individual TRCHs and selecting the reference TRCH, the reference-TRCH determining unit 407 outputs the ID of the reference TRCH to both the target-BLER obtaining unit 408 and the BLER measuring unit 409.

The manner of calculating the FECp using the data coding scheme by the reference-TRCH determining unit 407 is described below. The reference-TRCH determining unit 407 stores therein a first point management table and identifies, upon receiving information about the coding-scheme management table from the channel CODEC 405, the FECps that are corresponding to the individual TRCHs by comparing the coding-scheme management table with the first point management table. The data structure of the first point management table is the same as the point management table illustrated in FIG. 4.

The manner of calculating the RMp using the data rate matching ratio by the reference-TRCH determining unit 407 is described below. The reference-TRCH determining unit 407 calculates the RMp of the TRCH using the following Equation:

$$RMp\ of\ TRCH = 100 \times (N+\Delta N)/N - 100$$

where N is the sum of the rate matching ratios of the TRCHs, and $\Delta N$ is the rate matching ratio of the TRCH that is subjected to the point calculation. The rate matching ratio is calculated using a well-known technology.

The manner of calculating the TBLERp using the target BLER by the reference-TRCH determining unit 407 is described below. The reference-TRCH determining unit 407 stores therein a second point management table and identifies, upon receiving information about the predetermined target BLERs of the individual TRCHs, the TBLERps that are corresponding to the individual TRCHs by comparing the received information with the second point management table. The data structure of the second point management table is the same as the point management table illustrated in FIG. 9.

Figure 12:
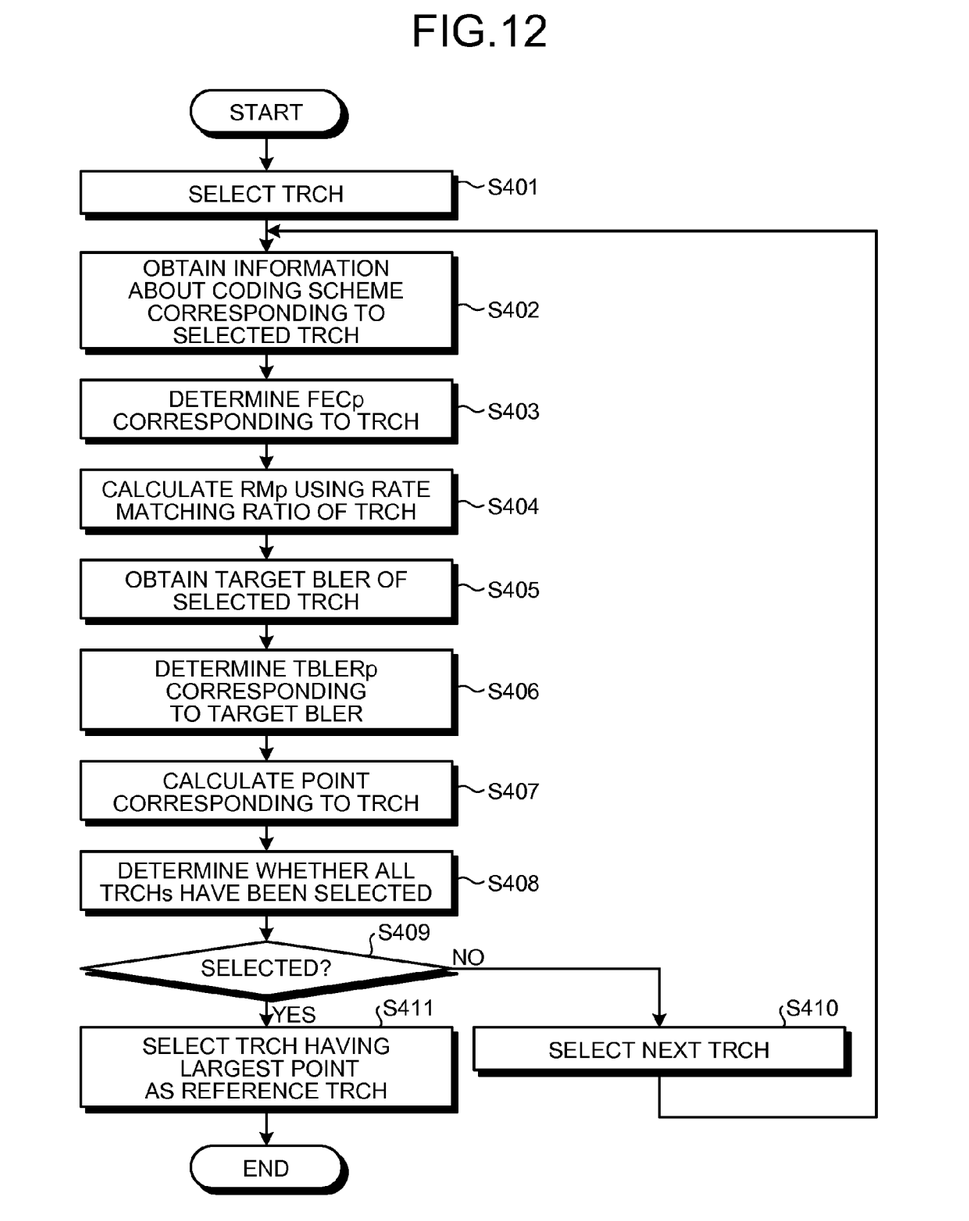
FIG. 12 is a flowchart of a process of selecting a TRCH performed by the wireless communication apparatus according to the fourth embodiment.

A process of selecting a TRCH performed by the wireless communication apparatus 400 according to the third embodiment is described below. FIG. 12 is a flowchart of the process of selecting a TRCH performed by the wireless communication apparatus 400 according to the fourth embodiment.

As illustrated in FIG. 12, in the wireless communication apparatus 400, the reference-TRCH determining unit 407 selects a TRCH (Step S401) and obtains information about the coding scheme corresponding to the selected TRCH (Step S402).

After that, the reference-TRCH determining unit 407 determines the FECp corresponding to the TRCH (Step S403), calculates the RMp using the rate matching ratio of the TRCH (Step S404), and obtains the target BLER of the selected TRCH (Step S405).

The reference-TRCH determining unit 407 determines the TBLERp corresponding to the target BLER (Step S406) and calculates the sum of FECp, the RMp, and the TBLERp as the total point corresponding to the TRCH (Step S407).

The reference-TRCH determining unit 407 determines whether all the TRCHs have been selected (Step S408). If one or more TRCHs have not been selected (No at Step S409), the next TRCH is selected (Step S410) and the process control goes to Step S402.

If all the TRCHs have been selected (Yes at Step S409), the reference-TRCH determining unit 407 selects a TRCH having the largest point as the reference TRCH (Step S411).

As described above, when the wireless communication apparatus 400 according to the fourth embodiment performs data communication with the base station using a plurality of TRCHs that share a frequency band, the wireless communication apparatus 400 selects the reference TRCH using the coding schemes of data to be transmitted using the TRCHs, the rate matching ratio, and the target BLER. After that, the wireless communication apparatus 400 performs outer loop control so that the BLER of data to be transmitted using the reference TRCH is set to the target BLER; therefore, the wireless communication apparatus 400 may select the most-suitable TRCH from the perspective of a variety of conditions (the coding scheme, the rate matching ratio, the and target BLER) and perform outer loop control in an appropriate manner.

Of the processes described in the embodiments, all or part of the processes explained as being performed automatically may be performed manually. Similarly, all or part of the processes explained as being performed manually may be performed automatically by a known method. The processing procedures, the control procedures, specific names, various data, and information including parameters described in the embodiments or illustrated in the drawings may be changed appropriately unless otherwise specified.

According to an aspect of the present invention, a wireless communication apparatus may select the most-suitable transport channel, which results in stability of line quality being maintained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus that performs data communication with a base station using a plurality of channels that share a frequency band, the wireless communication apparatus comprising:
a storage unit that stores therein information to identify the channels and coding schemes or target error rates of data to be transmitted using the channels in an associated manner;
a selecting unit that selects a reference channel according to the coding schemes or target error rates of the data to be transmitted using the channels; and
an outer-loop control unit that performs outer loop control so that an error rate of the data to be transmitted using the reference channel selected by the selecting unit is set to a target error rate.

2. The wireless communication apparatus according to claim 1, wherein
the storage unit stores therein first points corresponding to the coding schemes and second points corresponding to the target error rates of the data, and the wireless communication apparatus further comprising
a point converting unit that converts rate matching ratios of the data to be transmitted into third points, and
the selecting unit selects the reference channel using the first points, the second points, and the third points.

3. A wireless communication apparatus that performs data communication with a base station using a plurality of channels that share a frequency band, the wireless communication apparatus comprising:
- a calculating unit that calculates rate matching ratios of data to be transmitted using the channels;
- a selecting unit that selects a reference channel according to the calculated result obtained by the calculating unit; and
- an outer-loop control unit that performs outer loop control so that an error rate of the data to be transmitted using the reference channel selected by the selecting unit is set to a target error rate.

4. A method for controlling a wireless communication apparatus that performs data communication with a base station using a plurality of channels that share a frequency band, the method comprising:

storing information to identify the channels and coding schemes or target error rates of data to be transmitted using the channels in a storage unit in an associated manner;
selecting a reference channel according to the coding schemes or target error rates of the data to be transmitted using the channels; and
performing outer loop control so that an error rate of the data to be transmitted using the reference channel selected at the selecting is set to a target error rate.

5. The control method according to claim 4, wherein
the storing includes storing first points corresponding to the coding schemes and second points corresponding to the target error rates of the data in the storage unit, and
the control method further comprising converting rate matching ratios of the data to be transmitted into third points, and
the selecting includes selecting the reference channel using the first points, the second points, and the third points.

* * * * *

UNITED STATES PATENT AND TRADEMARK OFFICE
CERTIFICATE OF CORRECTION

PATENT NO. : 8,230,273 B2
APPLICATION NO. : 12/718318
DATED : July 24, 2012
INVENTOR(S) : Yoshifumi Uchiyama et al.

It is certified that error appears in the above-identified patent and that said Letters Patent is hereby corrected as shown below:

On the Title Page, Item (75) should read:

Inventors: Yoshifumi Uchiyama, Kawasaki (JP);
Haruhiro SHIINO, Kanagawa (JP)

Signed and Sealed this
Sixth Day of November, 2012

David J. Kappos
*Director of the United States Patent and Trademark Office*